United States Patent
Inoue et al.

(10) Patent No.: US 10,821,600 B2
(45) Date of Patent: Nov. 3, 2020

(54) ROBOT WITH HOLLOW WRIST ELEMENT

(71) Applicant: Fanuc Corporation, Minamitsuru-gun, Yamanashi (JP)

(72) Inventors: Toshihiko Inoue, Yamanashi (JP); Toshikatsu Kuroki, Yamanashi (JP); Naoki Fujioka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 140 days.

(21) Appl. No.: 16/118,665

(22) Filed: Aug. 31, 2018

(65) Prior Publication Data

US 2019/0077012 A1    Mar. 14, 2019

(30) Foreign Application Priority Data

Sep. 8, 2017   (JP) .................................. 2017-173026

(51) Int. Cl.
| | |
|---|---|
| *B25J 9/04* | (2006.01) |
| *B25J 19/00* | (2006.01) |
| *B25J 9/16* | (2006.01) |
| *B23K 26/08* | (2014.01) |

(52) U.S. Cl.
CPC .......... *B25J 9/047* (2013.01); *B23K 26/0884* (2013.01); *B25J 9/1612* (2013.01); *B25J 19/0037* (2013.01); *B25J 9/161* (2013.01)

(58) Field of Classification Search
CPC ...... B25J 9/047; B25J 9/1612; B25J 19/0029; B25J 19/0037; B25J 9/161; B25J 19/0025; B23K 26/0884
See application file for complete search history.

(56) References Cited

U.S. PATENT DOCUMENTS

| | | | |
|---|---|---|---|
| 6,250,174 B1 * | 6/2001 | Terada | ..................... B25J 9/047 |
| | | | 414/918 |
| 7,202,442 B2 * | 4/2007 | Nakagiri | .............. B25J 19/0029 |
| | | | 219/125.1 |
| 7,322,258 B2 | 1/2008 | Shiraki et al. | |
| 8,629,350 B2 | 1/2014 | Ljungkvist | |
| 8,631,720 B2 | 1/2014 | Nakagiri et al. | |
| 8,863,606 B2 | 10/2014 | Ichibangase et al. | |
| 9,481,095 B2 * | 11/2016 | Takahashi | ................ B25J 17/02 |
| 9,694,493 B2 | 7/2017 | Souk | |

(Continued)

FOREIGN PATENT DOCUMENTS

| | | | |
|---|---|---|---|
| CN | 102218743 A | | 10/2011 |
| CN | 202241313 U | | 5/2012 |

(Continued)

*Primary Examiner* — Thomas C Diaz
(74) *Attorney, Agent, or Firm* — RatnerPrestia

(57) ABSTRACT

A robot which can prevent an excessive bending of an wire member. The robot includes a first wrist element coupled rotatably about a first axis, a second wrist element coupled rotatably about a second axis, a third wrist element coupled rotatably about a third axis and supporting an end effector configured to perform a work on a workpiece, a first wire member disposed in such a way as to pass through the inside of the first wrist element, the second wrist element, and the third wrist element and connected to the end effector, and a second wire member disposed in such a way as to pass through the inside of the first wrist element and run outside the second wrist element and the third wrist element and connected to the end effector.

9 Claims, 6 Drawing Sheets

(56) References Cited

U.S. PATENT DOCUMENTS

| | | | |
|---|---|---|---|
| 9,975,239 B2 | 5/2018 | Kinoshita et al. | |
| 2003/0226940 A1 | 12/2003 | Karlinger | |
| 2011/0252915 A1* | 10/2011 | Nakagiri | B25J 19/0029 |
| | | | 74/490.02 |
| 2016/0008905 A1 | 1/2016 | Izawa et al. | |
| 2017/0072573 A1 | 3/2017 | Motokado et al. | |

FOREIGN PATENT DOCUMENTS

| | | |
|---|---|---|
| CN | 102896641 A | 1/2013 |
| CN | 103298588 A | 9/2013 |
| CN | 103659801 A | 3/2014 |
| CN | 106514688 A | 3/2017 |
| EP | 2551068 B1 | 1/2013 |
| JP | 2003136462 A | 5/2003 |
| JP | 2005096073 A | 4/2005 |
| JP | 2006-055954 A | 3/2006 |
| JP | 2012096332 A | 5/2012 |
| JP | 2016016445 A | 2/2016 |
| JP | 2016159399 A | 9/2016 |
| KR | 20170062592 A | 6/2017 |

\* cited by examiner

ROBOT WITH HOLLOW WRIST ELEMENT

CROSS-REFERENCE TO RELATED APPLICATION

This application is a new U.S. Patent Application that claims benefit of Japanese Patent Application No. 2017-173026, filed Sep. 8, 2017, the disclosure of this application is being incorporated herein by reference in its entirety for all purposes.

BACKGROUND OF THE INVENTION

1. Field of the Invention

The present invention relates to a robot with a hollow wrist element.

2. Description of the Related Art

Robots with a hollow wrist element and an wire member disposed inside the wrist element are known (e.g., Japanese Unexamined Patent Publication (Kokai) No. 2006-055954). A technique for preventing an excessive bending of the wire member is conventionally desired.

SUMMARY OF INVENTION

In an aspect of the present disclosure, a robot includes a hollow first wrist element coupled to a distal end of a robot arm so as to be rotatable about a first axis; a hollow second wrist element coupled to the first wrist element so as to be rotatable about a second axis intersecting the first axis; a third wrist element coupled to the second wrist element so as to be rotatable about a third axis intersecting the second axis, the third wrist element supporting an end effector configured to carry out a work on a workpiece; a first wire member wired so as to pass through the inside of the first wrist element, the second wrist element, and the third wrist element, and connected to the end effector; and a second wire member wired so as to pass through the inside of the first wrist element, while passing outside of the second wrist element and the third wrist element, and connected to the end effector.

According to the present disclosure, the wire member can be disposed in such a way as to pass through the inside of the first wrist element, and thereby it is possible to eliminate the need of a member such as a hanger for hanging the wire member to prevent the wire member from interfering with the surrounding object and to effectively prevent the radius of curvature of the wire member from being equal to or smaller than the allowable value.

DETAILED DESCRIPTION

Figure 1:
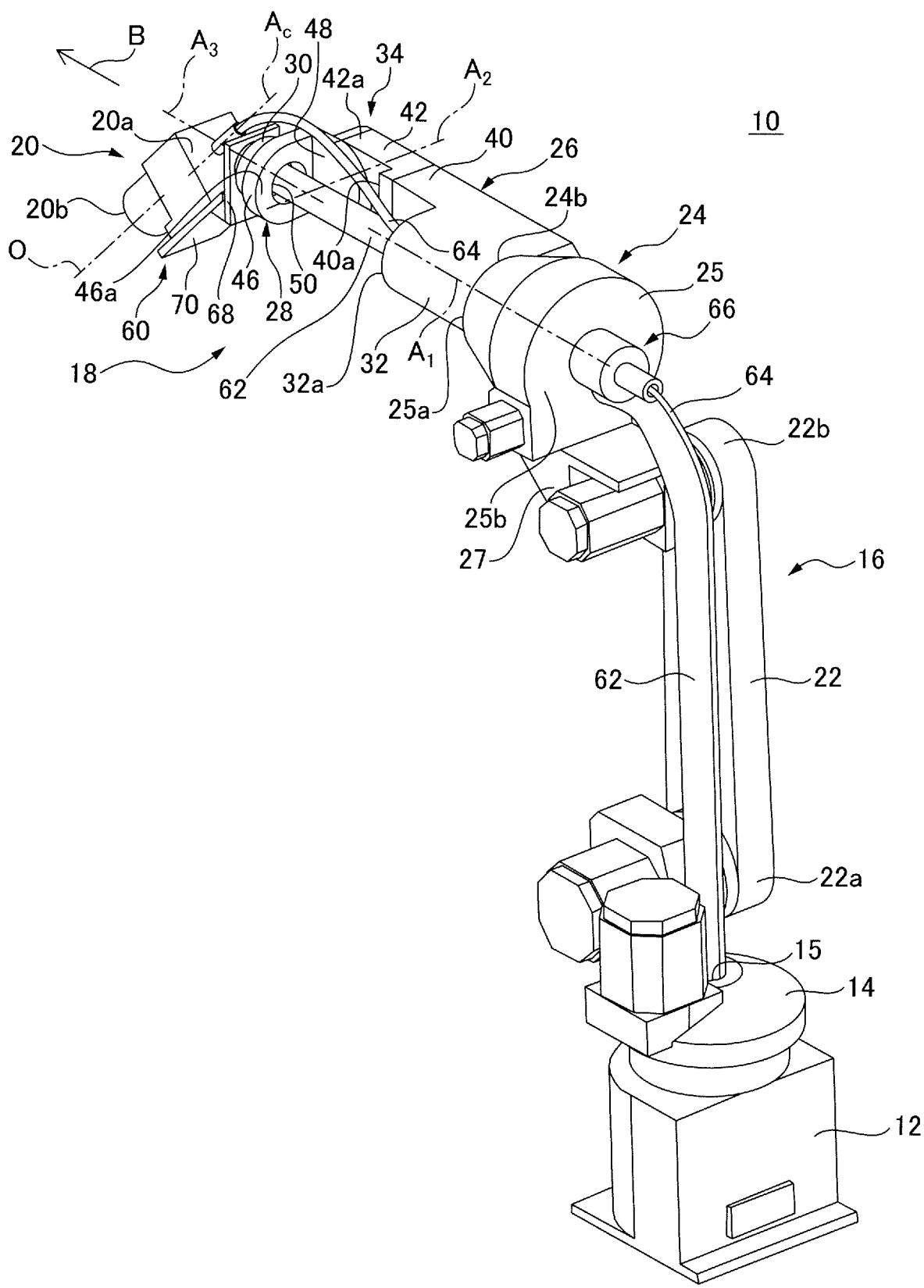
FIG. 1 is a perspective view of a robot according to an embodiment.

Embodiments of the present disclosure will be described below in detail, with reference to the attached drawings. In the various embodiments described below, similar elements are assigned the same reference numerals, and repetitive descriptions thereof will be omitted. First, with reference to FIGS. 1 to 4, a robot 10 according to an embodiment will be described.

A robot 10 includes a base 12, a swiveling body 14, a robot arm 16, a wrist 18, an adapter 60, a first wire member 62, a second wire member 64, and a wire member casing 66. The base 12 is fixed on a floor of a work cell. The swiveling body 14 is mounted on the base 12 so as to be rotatable about a vertical axis. The swiveling body 14 is formed with a hole 15 extending in the direction of the vertical axis.

The robot arm 16 includes a first arm 22 and a second arm 24. The first arm 22 is rotatably supported by the swiveling body 14 at its proximal end 22a. The second arm 24 includes a hollow section 25 and an attachment section 27 extending outwardly from the hollow section 25.

In the central part of the hollow section 25, a through hole 38 is formed so as to extend along a first axis $A_1$. The attachment section 27 is rotatably coupled to a distal end 22b of the first arm 22. The swiveling body 14 and the robot arm 16 respectively include a swiveling body driver and a robot arm driver.

Each of the swiveling body driver and the robot arm driver includes a servo motor and a speed reducer coupled to the output shaft of the servo motor. The swiveling body driver and the robot arm driver respectively drive the swiveling body 14 and the robot arm 16 in accordance with commands from a controller.

The wrist 18 includes a first wrist element 26, a second wrist element 28, and a third wrist element 30. The first wrist element 26 is coupled to the second arm 24 so as to be rotatable about the first axis $A_1$. The first wrist element 26 includes a hollow section 32 and an extended section 34.

The hollow section 32 extends along the first axis $A_1$ from a distal end 25a of the hollow section 25 of the second arm 24. In the central part of the hollow section 32, a through hole 36 (FIG. 3) is formed to so as to extend through the hollow section 32 along the first axis $A_1$. The through hole 36 is in communication with the through hole 38 formed in the hollow section 25 of the second arm 24.

The extended section 34 is a plate-shaped member extending from a distal end 32a of the hollow section 32 along the first axis $A_1$. The extended section 34 includes a first part 40 and a second part 42. The first part 40 is fixed to the distal end 32a of the hollow section 32. The second part 42 extends from a distal end 40a of the first part 40 along the first axis $A_1$. The second part 42 has a thickness smaller than the first part 40.

The first wrist element 26 is rotated about the first axis $A_1$ by a first wrist driver provided in the second arm 24. The first wrist driver includes a servo motor and a first speed reducer coupled to the output shaft of the servo motor.

The second wrist element 28 is coupled to a distal end 42a (FIG. 1) of the second part 42 of the first wrist element 26 so as to be rotatable about a second axis $A_2$. The second axis $A_2$ is orthogonal to the first axis $A_1$ and rotatable about the first axis $A_1$.

The second wrist element 28 includes a hollow section 46 and an extended section 48. In the central part of the hollow section 46, a through hole 50 (FIG. 3) is formed so as to extend through the hollow section 46 along a third axis $A_3$. The third axis $A_3$ is orthogonal to the second axis $A_2$ and rotatable about the second axis $A_2$.

The extended section 48 is a plate-shaped member extending from a proximal end 46a of the hollow section 46 and is coupled to the distal end 42a of the second part 42 of the first wrist element 26 so as to be rotatable about the second axis $A_2$.

The second wrist element 28 is rotated about the second axis $A_2$ by a second wrist driver. The second wrist driver includes a servo motor and a second speed reducer coupled to the output shaft of the servo motor. The second wrist driver is mounted in the extended section 34 of the first wrist element 26.

The third wrist element 30 is mounted at the hollow section 46 of the second wrist element 28 so as to be rotatable about the third axis $A_3$. The third wrist element 30 is a hollow member and formed with a through hole 54 (FIG. 3) extending through the third wrist element 30 along the third axis $A_3$ at its central part. The through hole 54 is in communication with the through hole 50 formed in the second wrist element 28.

The third movable element 30 is rotated about the third axis $A_3$ by a third wrist driver. The third wrist driver includes a servo motor and a third speed reducer coupled to the output shaft of the servo motor. The servo motor of the third wrist driver is mounted in the extended section 34 of the first wrist element 26, and the third speed reducer is mounted in the extended section 34 and the extended section 48 of the second wrist element 28.

The adapter 60 includes a first part 68 and a second part 70. The first part 68 is a flat plate-shaped member fixed to a distal end 30a (FIG. 2) of the third wrist element 30. In the central part of the first part 68, a through hole 72 (FIG. 3) is formed. The through hole 72 is in communication with the through hole 54 of the third wrist element 30.

The second part 70 is a flat plate-shaped member extending parallel to an output axis O and a connection axis $A_C$. The output axis O and the connection axis $A_C$ will be described later. The proximal end of the second part 70 is coupled to the first part 68 at a position separate away from the third axis $A_3$, wherein the second part 70 separates away from the third axis $A_3$ the further as it extends toward its distal end.

An end effector 20 is fixed to the second part 70 of the adapter 60. Thus, the end effector 20 is supported by the third wrist element 30 via the adapter 60. The end effector 20 carries out a work on a workpiece (not illustrated) from the direction of the output axis O.

When carrying out the work on the workpiece by the end effector 20, the robot 10 disposes the end effector 20 at a work position with respect to the workpiece. When the end effector 20 is disposed at the work position, the output axis O is positioned so as to intersect with an area to be processed of the workpiece.

As an example, the end effector 20 is a laser processing tool. In this case, the end effector 20 emits a laser beam along the output axis O, and carries out laser processing on the area to be processed of the workpiece by the emitted laser beam.

As another example, the end effector 20 is a welding torch. In this case, the end effector 20 feeds a welding wire along the output axis O, and carries out welding on the area to be processed of the workpiece with using the fed welding wire.

As still another example, the end effector 20 is a material-application tool. In this case, the end effector 20 sprays an embrocation, such as sealant, adhesive, or paint, along the output axis O, and carries out sealing, adhesion, or painting on the area to be processed of the workpiece with using the sprayed embrocation.

The end effector 20 includes a proximal end 20a and a distal end 20b opposite the proximal end 20a. The first wire member 62 and the second wire member 64 are connected to the proximal end 20a. An output opening for e.g. the laser beam, welding wire or embrocation is formed at the distal end 20b, and outputs the laser beam, welding wire or embrocation in the direction of the output axis O.

Figure 2:
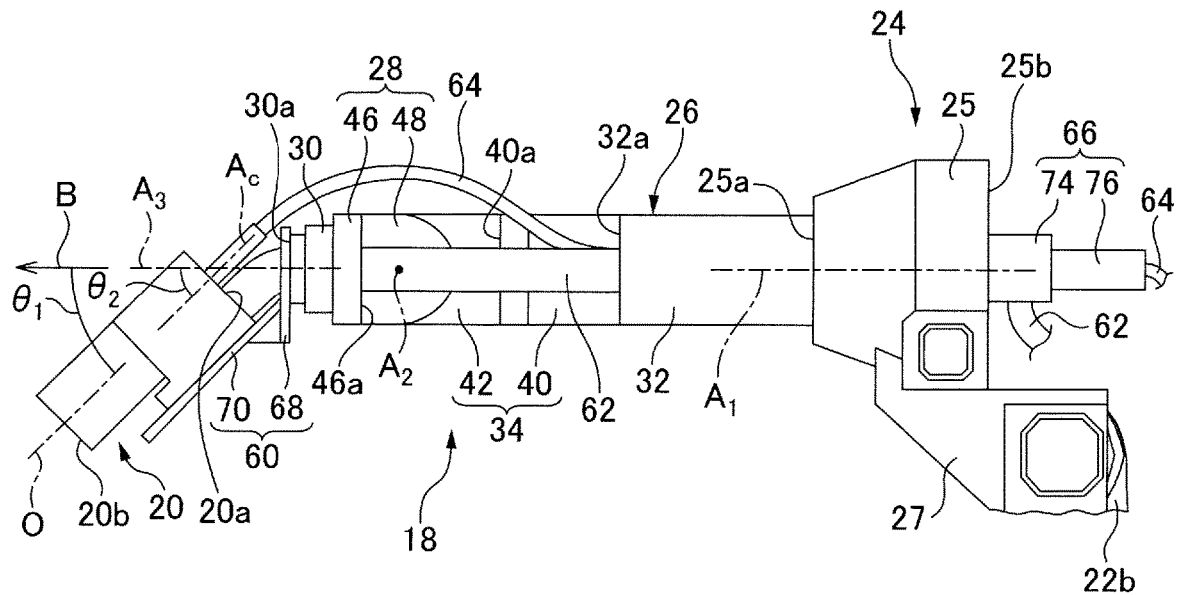
FIG. 2 is a side view of a wrist and an end effector of the robot illustrated in FIG. 1.
Figure 3:
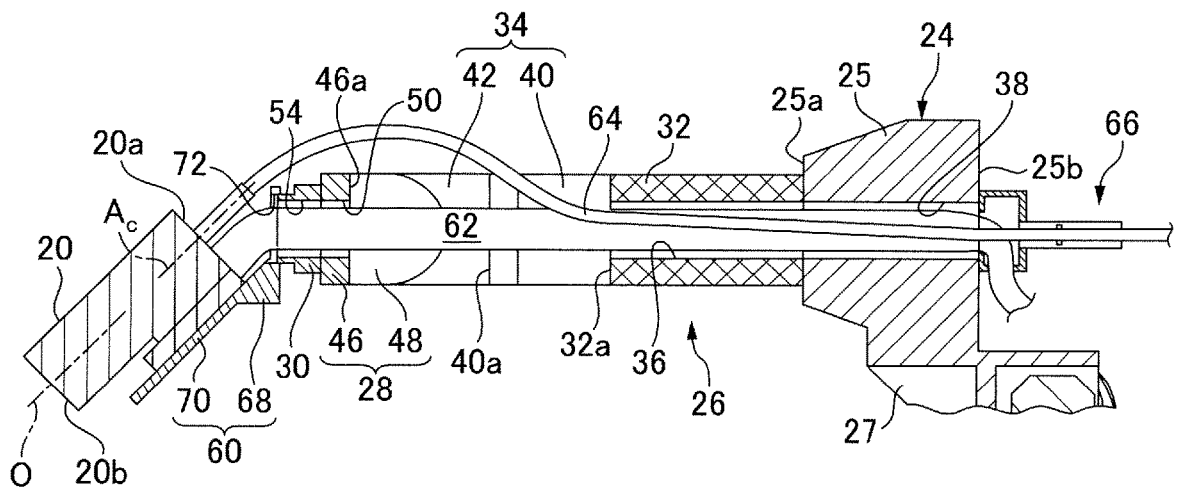
FIG. 3 is a cross sectional view of the wrist and the end effector of the robot illustrated in FIG. 2.

The end effector 20 is disposed by the adapter 60 such that the output axis O is inclined with respect to the third axis $A_3$ by an inclination angle $\theta_1$ (FIG. 2). The inclination angle $\theta_1$ is 45° in this embodiment. However, the inclination angle $\theta_1$ is not limited thereto and may be set at an angle from 30° to 60°.

Due to this inclination, the end effector 20 extends along the output axis O so as to separate away from the third axis $A_3$ the further as it extends from its proximal end 20a toward its distal end 20b. Therefore, the distal end 20b of the end effector 20 is disposed more distant from the third axis $A_3$ than the proximal end 20a. The respective centers of the proximal end 20a and the distal end 20b of the end effector 20 are disposed at positions separate away from the third axis $A_3$ in the downward direction in FIGS. 1 to 3.

The proximal end 20a of the end effector 20 is disposed separate away from the distal end 30a of the third wrist element 30 (or the first part 68 of the adapter 60) in the direction indicated by the arrow B in FIG. 2. The direction B is a direction of the third axis $A_3$ directed toward the distal end 30a from the proximal end (not illustrated) of the third wrist element 30.

By forming this inclination angle $\theta_1$, it is possible to reduce the rotation angle of the second wrist element 28 about the second axis $A_2$ when the robot 10 disposes the end effector 20 in the work position. This function will be described later.

Figure 4:
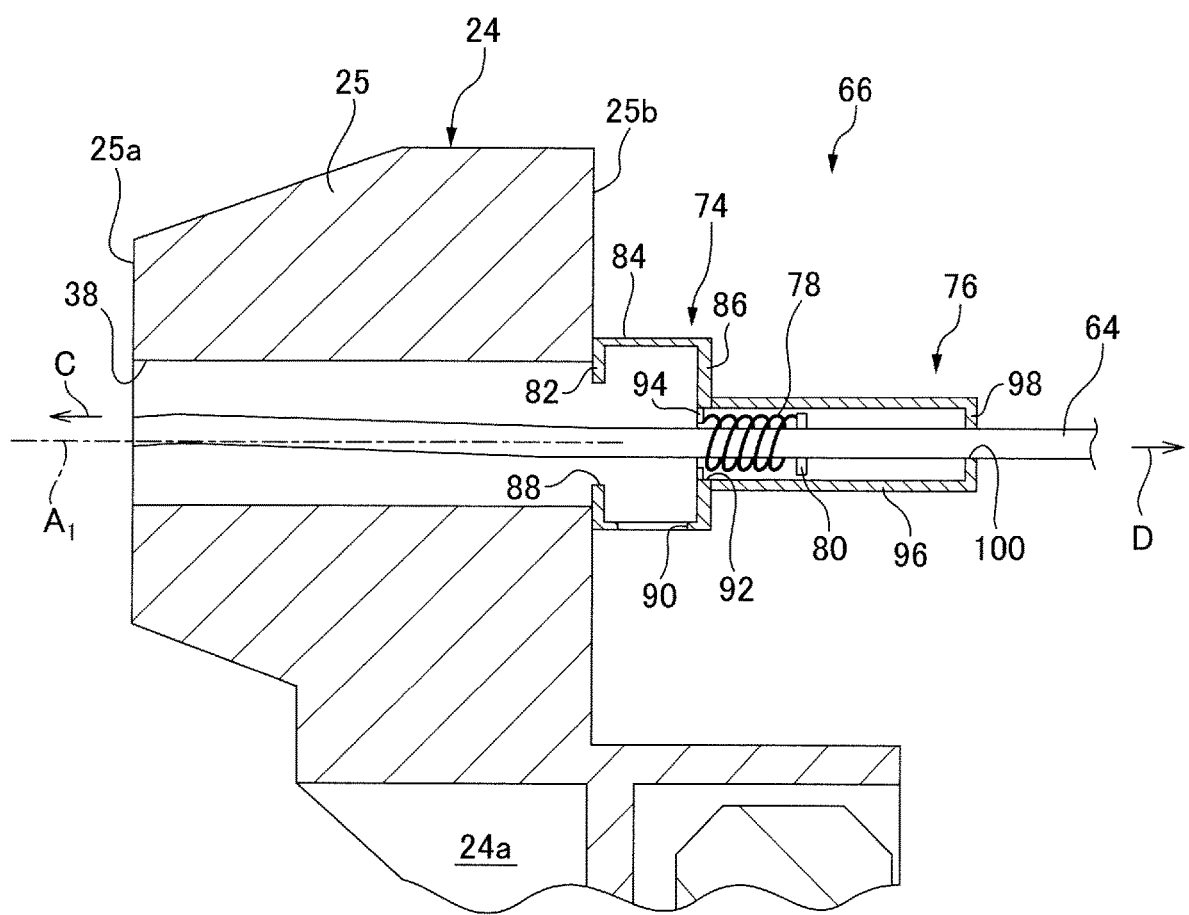
FIG. 4 is an enlarged cross sectional view of the wire member casing illustrated in FIG. 2, the first wire member not illustrated for the sake of an easier understanding.

As illustrated in FIG. 4, the wire member casing 66 includes a first part 74, a second part 76, a biasing section 78, and a clamp 80. The first part 74 is hollow and fixed to the proximal end 25b of the hollow section 25 of the second arm 24. The first part 74 and the second part 76 are disposed concentrically with respect to the first axis $A_1$.

Specifically, the first part 74 includes a distal wall 82 fixed to the proximal end 25b of the hollow section 25, a proximal wall 86 opposite the distal wall 82, and a side wall 84 extending between the distal wall 82 and the proximal wall 86.

A through hole 88 is formed at the distal wall 82. A through hole 90 is formed at the side wall 84. Further, a through hole 92 is formed at the proximal wall 86. On the wall surface which defines the through hole 92, an annular projection 94 is formed so as to project inward.

The second part 76 is hollow and extends from the first part 74 in the direction opposite the hollow section 25. Specifically, the second part 76 includes a side wall 96 connected to the first part 74 and a proximal wall 98 provided at a proximal end of the side wall 96. A through hole 100 is formed at the proximal wall 98. The through hole 88, the through hole 92, and the through hole 100 are disposed concentrically with respect to the first axis $A_1$.

The clamp 80 is annular and disposed inside the second part 76 so as to be slidable along the first axis $A_1$. On the other hand, the clamp 80 is fitted over the outer circumferential surface of the second wire member 64 so as not to slide relative to the second wire member 64.

The biasing section 78 is e.g. a coil spring, and is inserted between the projection 94 of the first part 74 and the clamp 80. The biasing section 78 indirectly engages the second wire member 64 via the clamp 80.

When the second wire member 64 is pulled in the direction indicated by the arrow C in FIG. 4, the clamp 80 is displaced in the direction C inside the second part 76 together with the second wire member 64. The biasing section 78 is then compressed and biases the clamp 80 and the second wire member 64 in the direction D opposite the direction C (i.e., toward the proximal end side of the first wrist element 26), as its reaction force. The direction C is a direction of the first axis $A_1$ directed toward the distal end 25a from the proximal end 25b of the hollow section 25.

On the other hand, when the second wire member 64 is pulled in the direction D, the clamp 80 is displaced in the direction D inside the second part 76 together with the second wire member 64. The biasing section 78 is then stretched and biases the clamp 80 and the second wire member 64 in the direction C (i.e., toward the distal end of the first wrist element 26), as its reaction force.

The first wire member 62 includes e.g. a control signal line for transmitting a signal for controlling the end effector 20, and the distal end of the first wire member 62 is connected to the proximal end 20a of the end effector 20. The first wire member 62 is wired so as to pass through the inside of the swiveling body 14, the hollow section 25 of the second arm 24, the hollow section 32 of the first wrist element 26, the hollow section 46 of the second wrist element 28, the third wrist element 30, and the through hole 72 of the adapter 60.

More specifically, the first wire member 62 extends out from the hole 15 of the swiveling body 14 and is inserted into the first part 74 via the through hole 90 formed at the first part 74 of the wire member casing 66.

Then, the first wire member 62 passes through the through hole 88 of the wire member casing 66, the through hole 38 of the hollow section 25 of the second arm 24, and the through hole 36 of the hollow section 32 of the first wrist element 26, and extends out from the distal end 32a of the first wrist element 26.

Then, the first wire member 62 is inserted into the through hole 50 of the hollow section 46 of the second wrist element 28, passes through the through hole 54 of the third wrist element 30 and the through hole 72 of the adapter 60, and is connected to the proximal end 20a of the end effector 20.

The first wire member 62 is connected to the proximal end 20a of the end effector 20 at a position separate away from the distal end 30a of the third wrist element 30 (or the first part 68 of the adapter 60) in the direction B.

The second wire member 64 is wired so as to pass through the inside of the swiveling body 14, the hollow section 25 of the second arm 24, and the hollow section 32 of the first wrist element 26, while passing outside of the hollow section 46 of the second wrist element 28, the third wrist element 30, and the through hole 72 of the adapter 60.

More specifically, the second wire member 64 extends out from the hole 15 of the swiveling body 14, and is inserted into the second part 76 of the wire member casing 66 via the through hole 100 formed at the second part 76.

Then, the second wire member 64 passes through the through holes 92 and 88 of the wire member casing 66, the through hole 38 of the hollow section 25 of the second arm 24, and the through hole 36 of the hollow section 32 of the first wrist element 26, and extends out from the distal end 32a of the first wrist element 26.

Then, the second wire member 64 passes outside of the through hole 50 of the hollow section 46 of the second wrist element 28, the through hole 54 of the third wrist element 30, and the through hole 72 of the adapter 60, and is connected to the proximal end 20a of the end effector 20 in the direction of the connection axis $A_C$ (i.e., the connection direction).

The connection axis $A_C$ is inclined with respect to the third axis $A_3$ by an inclination angle $\theta_2$ (FIG. 2). In this embodiment, the connection axis $A_C$ is parallel (more specifically, coincident) with the output axis O. Therefore, the inclination angle $\theta_1$ is equal to the inclination angle $\theta_2$ (i.e., $\theta_1 = \theta_2$).

The second wire member 64 is connected to the proximal end 20a of the end effector 20 at a position separate away from the distal end 30a of the third wrist element 30 in the direction B. In this embodiment, the second wire member 64 is connected to the proximal end 20a of the end effector 20 at a position where the third axis $A_3$ intersects with the output axis O (or in the vicinity of this position).

As an example, if the end effector 20 is a laser processing tool, the second wire member 64 is an optical fiber cable and transmitting a laser beam to the end effector 20. As another example, if the end effector 20 is a welding tool, the second wire member 64 is a conduit tube containing a welding wire therein, and feeds the welding wire to the end effector 20.

As still another example, if the end effector 20 is a material-application tool, the second wire member 64 is an embrocation-supply tube for supplying the embrocation, and supplies the embrocation to the end effector 20.

As described above, in this embodiment, the second wire member 64 is wired so as to pass through the inside of the first wrist element 26. By allowing the second wire member 64 to be wired inside the wrist 18, a member, such as a hanger, for hanging the second wire member 64 to prevent the second wire member 64 from interfering with an environmental object can be unnecessary.

On the other hand, the second wire member 64 is wired so as to pass outside of the second wrist element 28 and the third wrist element 30. Due to this configuration, the second wire member 64 can freely bend without being constrained by the second wrist element 28 and the third wrist element 30, when the second wrist element 28 is rotated about the second axis $A_2$.

As a result, it is possible to prevent the second wire member 64 from excessively bending, and thereby prevent the radius of curvature of the second wire member 64 from excessively decreasing to be smaller than the allowable value. The allowable value for the radius of curvature of the second wire member 64 can be determined based on the type of the second wire member 64 (optical fiber cable, conduit tube, embrocation-supply tube, etc.).

For example, the allowable value is determined as a threshold value defining the border of whether the capacity of the second wire member 64 to send the element (e.g., a laser beam) for work is hindered or not, or of whether the second wire member 64 is irreversibly deformed or not.

Further, in this embodiment, the end effector 20 is disposed such that its output axis O is inclined with respect to the third axis $A_3$. According to this configuration, when the workpiece is placed downward of the end effector 20 in FIGS. 1 to 3, it is possible to reduce the rotation angle of the second wrist element 28 about the second axis $A_2$ for positioning the end effector 20 at the work position where the output axis O intersects with the area to be processed of the workpiece. Accordingly, it is possible to speedily position the end effector 20 at the work position, and prevent the radius of curvature of the second wire member 64 from excessively decreasing to be smaller than the allowable value.

Further, in this embodiment, the respective centers of the proximal end 20a and the distal end 20b of the end effector 20 are disposed at positions so as to be displaced away from the third axis $A_3$. According to this configuration, the end effector 20 can be positioned at the work position more easily.

Further, in this embodiment, the second wire member 64 is connected to the end effector 20 in the direction of the connection axis $A_C$ (the connection direction), which is inclined with respect to the third axis $A_3$. According to this configuration, since the radius of curvature for the second wire member 64 can be more easily kept larger, it is possible to more effectively prevent the radius of curvature from being smaller than the allowable value.

Further, in this embodiment, the second wire member 64 is connected to the end effector 20 at a position separate away from the distal end 30a of the third wrist element 30 in the direction B. According to this configuration, since the radius of curvature for the second wire member 64 can be more easily kept larger, it is possible to more effectively prevent the radius of curvature from being smaller than the allowable value.

Further, in this embodiment, the biasing section 78 biases the second wire member 64 in the direction D (i.e., toward the proximal end of the first wrist element 26) when the second wire member 64 is pulled in the direction C. In contrast, when the second wire member 64 is pulled in the direction D, the biasing section 78 biases the second wire member 64 in the direction C (i.e., toward the distal end of the first wrist element 26).

According to this configuration, since the length of a part of the second wire member 64 exposed outside between the end effector 20 and the first wrist element 26 can be kept within an appropriate range, it is possible to keep the bending of the second wire member 64 between the end effector 20 and the first wrist element 26 to be within an appropriate range.

Further, in this embodiment, the second wire member 64 is wired so as to pass through the inside of the swiveling body 14. According to this configuration, it is possible to effectively prevent the second wire member 64 from interfering with environmental object around the swiveling body 14.

Note that, in the above-described embodiment, the end effector 20 is disposed at a position separate away from the third axis $A_3$. However, the center of the end effector 20 may be disposed on the third axis $A_3$.

Figure 5:
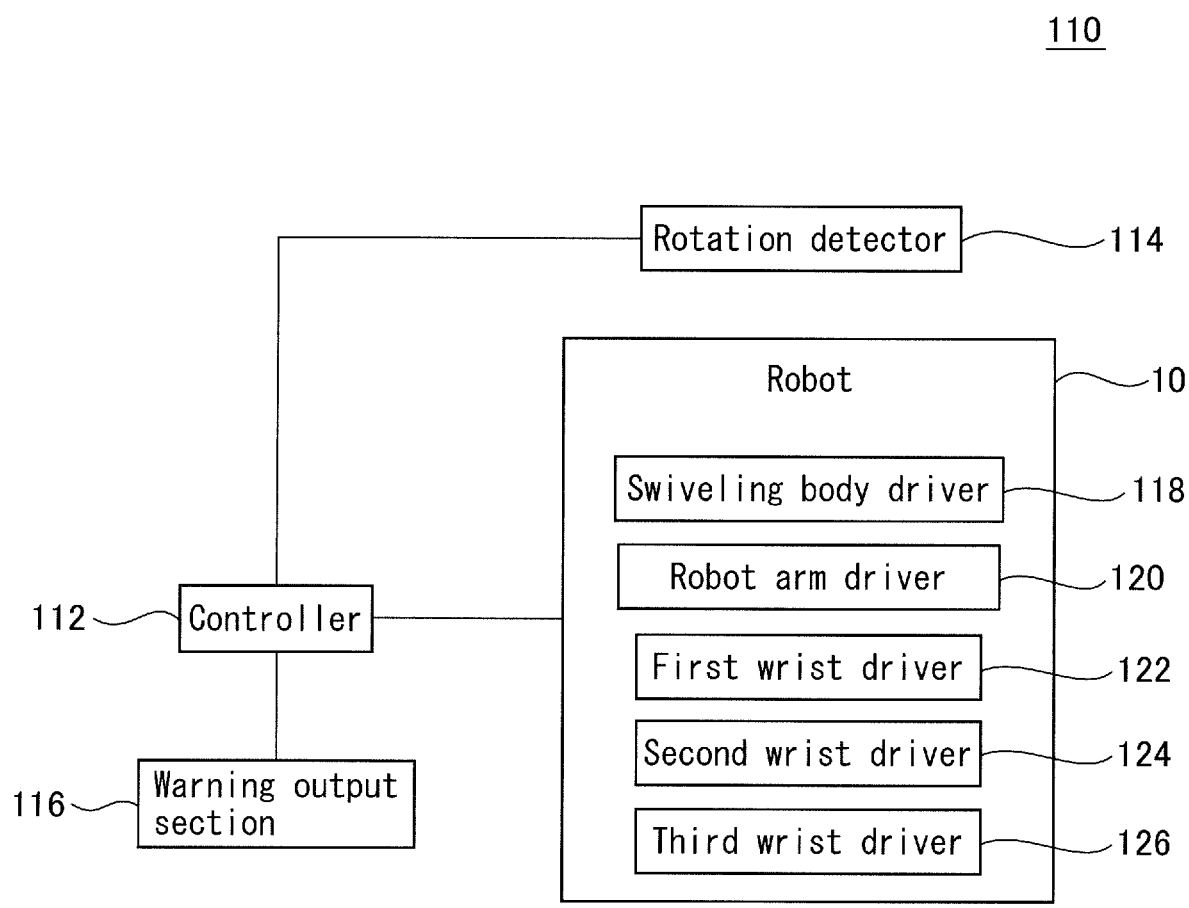
FIG. 5 is a block diagram of a robot system according to an embodiment.

Next, with reference to FIG. 5, a robot system 110 according to an embodiment will be described. The robot system 110 includes a robot 10, a controller 112, a rotation detector 114, and a warning output section 116. The robot 10 includes a swiveling body driver 118, a robot arm driver 120, a first wrist driver 122, a second wrist driver 124, and a third wrist driver 126.

The controller 112 includes e.g. a processor and a memory, and controls each component of the robot 10 directly or indirectly. Specifically, the controller 112 sends commands to the swiveling body driver 118 and the robot arm driver 120 so as to move the swiveling body 14 and the robot arm 16.

Further, the controller 112 sends a command to the first wrist driver 122 so as to rotate the first wrist element 26 about the first axis $A_1$. Further, the controller 112 sends a command to the second wrist driver 124 so as to rotate the second wrist element 28 about the second axis $A_2$.

Further, the controller 112 sends a command to the third wrist driver 126 so as to rotate the third wrist element 30 about the third axis $A_3$. In this way, the controller 112 moves the swiveling body 14, the robot arm 16, and the wrist 18 so as to position the end effector 20 at any position and orientation.

The rotation detector 114 includes e.g. an encoder or a Hall element, and detects a rotation angle R of the second wrist element 28. The rotation detector 114 sends the detected data of the rotation angle R to the controller 112. The warning output section 116 includes e.g. a speaker or a display, and outputs the warning signal received from the controller 112 to the operator in the form of a sound or image.

Figure 6:
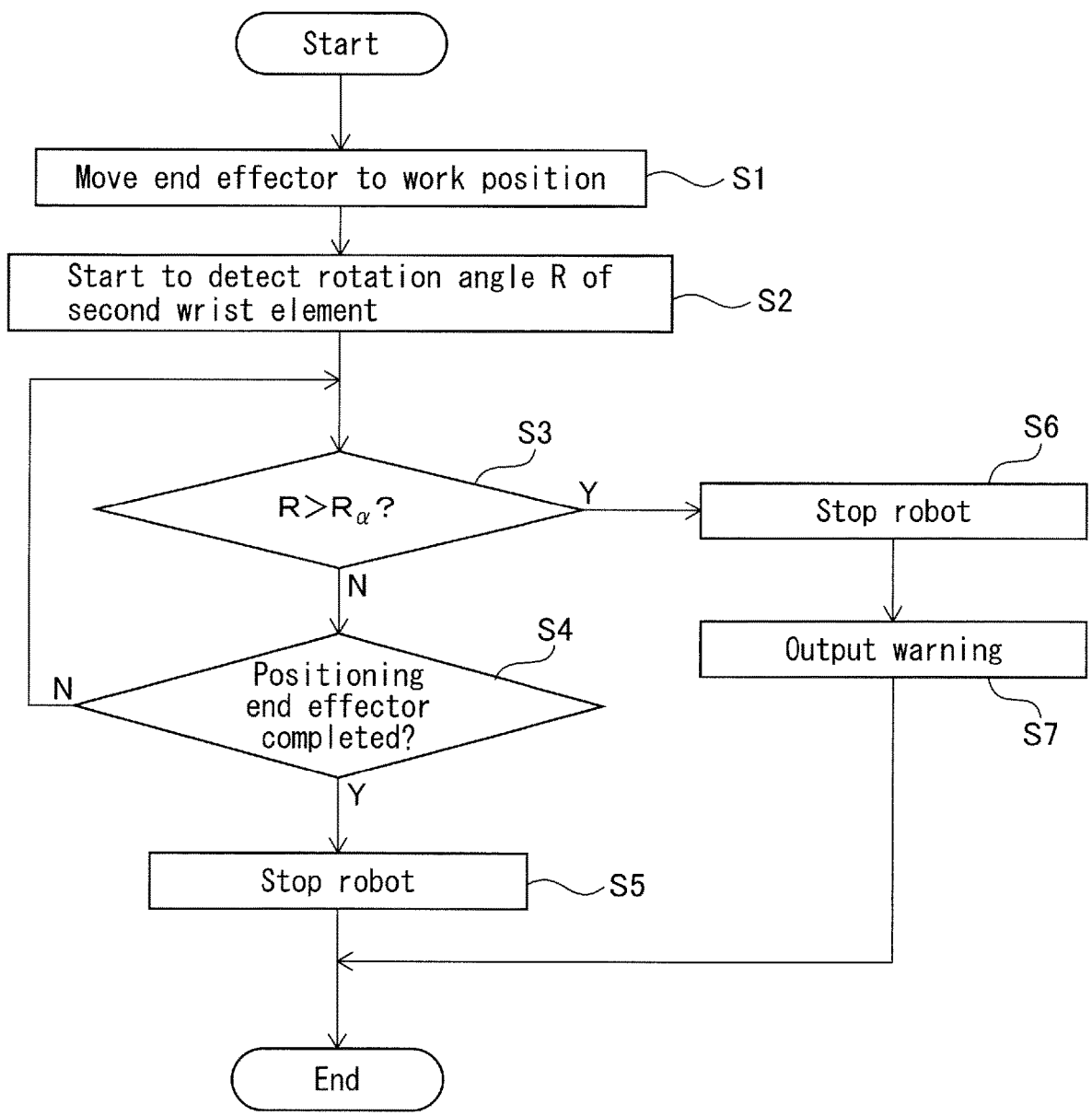
FIG. 6 is a flow chart illustrating an example of an operational process of the robot system illustrated in FIG. 5.

Next, with reference to FIG. 6, an operation of the robot system 110 will be described. The process illustrated in FIG. 6 is started when the controller 112 receives a command for positioning the end effector 20 at the work position from a host controller, an operator, or a computer program.

In step S1, the controller 112 operates the robot 10 and starts the operation to move the end effector 20 to the work position. Specifically, the controller 112 sends commands to the swiveling body driver 118, the robot arm driver 120, the first wrist driver 122, the second wrist driver 124, and the third wrist driver 126 so as to operate the swiveling body 14, the robot arm 16, and the wrist 18 to move the end effector 20 toward the work position.

For example, the controller 112 generates commands for the swiveling body driver 118, the robot arm driver 120, the first wrist driver 122, the second wrist driver 124, and the third wrist driver 126 in accordance with a computer program, and sends the commands to these components.

This computer program can be constructed by teaching the robot 10 the motion to move the end effector 20 to the work position. This computer program can be pre-stored in the memory of the controller 112.

In step S2, the controller 112 starts to detect the rotation angle R of the second wrist element 28. Specifically, the controller 112 sends an angle detection command to the rotation detector 114. Upon receiving the angle detection command, the rotation detector 114 detects the rotation angle R of the second wrist element 28 periodically (e.g., at a period T=1 second), and sequentially sends the angle data to the controller 112.

In step S3, the controller 112 determines whether or not the rotation angle R most-recently received from the rotation detector 114 exceeds a predetermined threshold value $R_\alpha$ (i.e., $R > R_\alpha$). The threshold value $R_\alpha$ is predetermined so as to correspond to the allowable value of the radius of curvature of the second wire member 64 when the second wrist element 28 rotates about the second axis $A_2$, and stored in the memory of the controller 112. The threshold value $R_\alpha$ can be determined by experimental techniques, simulations, or the like.

The controller 112 proceeds to step S6 when it determines that the rotation angle R exceeds the threshold value $R_\alpha$ (i.e., determines YES). On the other hand, the controller 112 proceeds to step S4 when it determines that the rotation angle R does not exceed the threshold value $R_\alpha$ (i.e., determines NO).

In step S4, the controller 112 determines whether or not the operation of positioning the end effector 20 at the work position is completed. For example, the controller 112 determines whether the operation of positioning the end effector 20 at the work position is completed based on the feedback (including the rotation angle R) from the each servomotor mounted in the robot 10.

The controller 112 proceeds to step S5 when it determines that the operation of positioning the end effector 20 at the work position is completed (i.e., determines YES). On the other hand, the controller 112 returns to step S3 when it determines that the operation of positioning the end effector 20 at the work position is not completed (i.e., determines NO).

In step S5, the controller 112 stops the robot 10. Specifically, the controller 112 stops to send the commands to the swiveling body driver 118, the robot arm driver 120, the first wrist driver 122, the second wrist driver 124, and the third wrist driver 126, and thereby stops the motions of these components. The controller 112 then ends the process illustrated in FIG. 6.

When the determination in step S3 is YES, the controller 112 stops the robot 10 in step S6, as in step S5.

In step S7, the controller 112 outputs a warning. For example, the controller 112 generates a warning signal indicating that "the first wire member may be excessively bent" in the form of a sound or image, and outputs it to the warning output section 116. The warning output section 116 outputs the received warning signal to the operator in the form of a sound or image.

As described above, in this embodiment, the controller 112 stops the operation of the robot 10 when the rotation angle R of the second wrist element 28 exceeds the threshold value $R_\alpha$ (step S6). According to this configuration, it is possible to reliably prevent the second wire member 64 from excessively bending during the execution of step S1.

Further, in this embodiment the controller 112 outputs a warning to the operator when the rotation angle R exceeds the threshold value $R_\alpha$ (step S7). According to this configuration, the operator can automatically and intuitively recognize that the second wire member 64 may be excessively bent during the execution of step S1.

Note that, in step S6, the controller 112 may not completely stop the robot 10, but may continue to operate the swiveling body 14, the robot arm 16, the first wrist element 26, and the third wrist element 30 to continuously move the end effector 20, while stopping the rotational motion of the second wrist element 28 only.

In this case, the controller 112 regenerates commands for the swiveling body driver 118, the robot arm driver 120, the first wrist driver 122, and the third wrist driver 126 to position the end effector 20 at the work position, and sends the commands to these components, while stopping to send the command to the second wrist driver 124.

According to this configuration, it is possible to continue the operation of positioning the end effector 20 at the work position, while preventing an excessive bending of the second wire member 64 by stopping the rotation of the second wrist element 28.

Next, with reference to FIG. 7, an adapter 130 and an end effector 132 according to another embodiment will be described. The adapter 130 and the end effector 132 can be applied to the robot 10, instead of the above-described adapter 60 and the end effector 20.

The adapter 130 includes the first part 68, a second part 132, a third part 134, and a fourth part 136. The second part 132, the third part 134, and the fourth part 136 are flat plate shaped members.

The second part 132 extends in the direction B from the outer circumference part of the first part 68 so as to be parallel to the third axis $A_3$. The third part 134 is coupled to a distal end of the second part 132, and disposed so as to be orthogonal to the third axis $A_3$.

The fourth part 136 is coupled to an end of the third part 134 opposite the second part 132, and inclined with respect to the third axis $A_3$. In this embodiment, the fourth part 136 is disposed parallel to the connection axis $A_C$.

Figure 7:
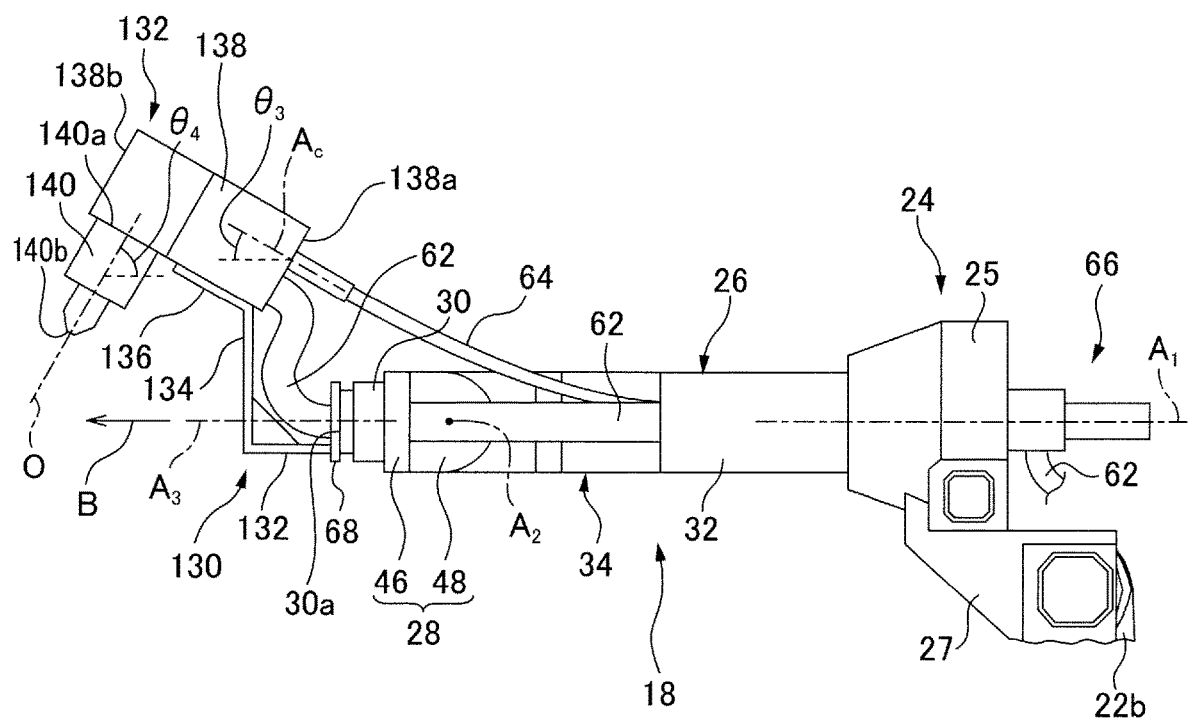
FIG. 7 illustrates an adapter and an end effector according to another embodiment.

The end effector 132 is supported by the adapter 130 such that the entirety of the end effector 132 is separate away from the third axis $A_3$ to upward direction in FIG. 7. The end effector 132 is hollow and includes a first part 138 and a second part 140 extending from a distal end of the first part 138 along the output axis O.

The first part 138 is fixed to the fourth part 136 of the adapter 130. The first wire member 62 and the second wire member 64 are connected to the proximal end 138*a* of the first part 138 in the direction of the connection axis $A_C$ (i.e., the connection direction). The connection axis $A_C$ is inclined with respect to the third axis $A_3$ at an inclination angle $\theta_3$.

The first part 138 extends along the connection axis $A_C$ so as to be separate away from the third axis $A_3$ the further as it extends from its proximal end 138*a* toward its distal end 138*b*. Therefore, the distal end 138*b* of the first part 138 is disposed more distant from the third axis $A_3$ than the proximal end 138*a*. The proximal end 138*a* of the first part 138 is disposed separate away from the distal end 30*a* of the third wrist element 30 (or the first part 68 of the adapter 130) in the direction B.

The second part 140 is disposed so as to be adjacent to the distal end 138*b* of the first part 138. The second part 140 extends along the output axis O so as to approach the third axis $A_3$ the further as it extends from its proximal end 140*a* toward its distal end 140*b*. Therefore, the distal end 140*b* of the second part 140 is disposed closer to the third axis $A_3$ than the proximal end 140*a* is.

An output opening for e.g. a laser beam, welding wire or embrocation is formed at the distal end 140*b* of the second part 140, wherein the laser beam, welding wire or embrocation is outputted therefrom in the direction of the output axis O. The output axis O is inclined with respect to the third axis $A_3$ at an inclination angle $\theta_4$. In this embodiment, since the connection axis $A_C$ is orthogonal to the output axis O, $\theta_4 = 90° - \theta_3$.

By forming the inclination angle $\theta_4$, it is possible to reduce the rotation angle of the second wrist element 28 about the second axis $A_2$ when the robot 10 disposes the end effector 132 at the work position, similarly to the above-described embodiment.

According to this embodiment, since the second wire member 64 is disposed so as to pass the inside of the first wrist element 26, a members such as a hanger for hanging the second wire member 64 to prevent the second wire member 64 from interfering with the environmental object can be unnecessary, similarly to the above-described embodiment.

On the other hand, the second wire member 64 is disposed so as to pass outside of the second wrist element 28 and the third wrist element 30. Accordingly, it is possible to prevent the second wire member 64 from excessively bending such that the radius of curvature of the second wire member 64 is smaller than the allowable value when the second wrist element 28 rotates about the second axis $A_2$.

In the above-described embodiments, the second wire member 64 is connected to the end effector 20, 132 at a position away from the distal end 30*a* of the third wrist element 30 in the direction B. However, the second wire member 64 may be connected to the end effector 20, 132 in the same position as the distal end 30*a* of the third wrist element 30 (or the first part 68 of the adapter 60) in the direction of the third axis $A_3$.

Further, the end effector 20, 132 may be directly fixed to the third wrist element 30 without using the adapter 60, 130. Further, the biasing section 78 is not limited to a coil spring but may be a pneumatic or hydraulic cylinder or may be a magnet or the like.

The present disclosure has been described with embodiments above, but the above-described embodiments do not place limitations on the invention formed at the claims.

The invention claimed is:

1. A robot comprising:
   a hollow first wrist element coupled to a distal end of a robot arm so as to be rotatable about a first axis;
   a hollow second wrist element coupled to the first wrist element so as to be rotatable about a second axis intersecting the first axis;
   a third wrist element coupled to the second wrist element so as to be rotatable about a third axis intersecting the second axis, the third wrist element supporting an end effector configured to carry out a work on a workpiece;
   a first wire member wired so as to pass through the inside of the first wrist element, the second wrist element, and the third wrist element, and connected to the end effector; and
   a second wire member wired so as to pass through the inside of the first wrist element, while passing outside of the second wrist element and the third wrist element, and connected to the end effector.

2. The robot according to claim 1, wherein the second wire member is connected to the end effector in a connection direction inclined with respect to the third axis.

3. The robot according to claim 1, wherein the end effector is supported by the third wrist element such that an output axis of the end effector is inclined with respect to the third axis in order to decrease an rotation angle of the second wrist element when disposing the end effector at a work position for carrying out the work.

4. The robot according to claim 3, further comprising an adapter configured to fix the end effector relative to the third wrist element.

5. The robot according to claim 1, wherein centers of a proximal end and a distal end opposite the proximal end of the end effector are disposed at positions inclined away from the third axis of the third wrist element.

6. The robot according to claim 1, wherein the second wire member is connected to the end effector at a position inclined away from the third wrist element in the third axis direction.

7. The robot according to claim 1, further comprising a biasing section engaging the second wire member so as to bias the second wire member toward a proximal end side of the first wrist element.

8. The robot according to claim 1, further comprising a hollow swiveling body rotatably supporting a proximal end of the robot arm,
   wherein the second wire member is wired so as to pass through the inside of the swiveling body.

9. The robot according to claim 1, wherein the end effector is a laser processing tool configured to output a laser beam, and
   the second wire member is an optical fiber configured to transmitting the laser beam to the end effector.

* * * * *